(12) United States Patent
Burleigh et al.

(10) Patent No.: US 8,868,319 B2
(45) Date of Patent: Oct. 21, 2014

(54) SYSTEM AND METHOD FOR CONTROLLING INTAKE VALVE TIMING IN HOMOGENEOUS CHARGE COMPRESSION IGNITION ENGINES

(75) Inventors: Darrell W. Burleigh, South Lyon, MI (US); Vijay Ramappan, Novi, MI (US); Ben W. Moscherosch, Waterford, MI (US)

(73) Assignee: GM Global Technolgy Operations LLC

( * ) Notice: Subject to any disclaimer, the term of this patent is extended or adjusted under 35 U.S.C. 154(b) by 824 days.

(21) Appl. No.: 13/112,496

(22) Filed: May 20, 2011

(65) Prior Publication Data

US 2012/0296556 A1    Nov. 22, 2012

(51) Int. Cl.
*F02D 9/02*    (2006.01)
*F02D 28/00*    (2006.01)
*F02D 41/26*    (2006.01)
*F02D 13/02*    (2006.01)
*F02D 41/30*    (2006.01)
*F02D 41/00*    (2006.01)

(52) U.S. Cl.
CPC ........ *F02D 41/266* (2013.01); *F02D 2041/001* (2013.01); *F02D 13/0265* (2013.01); *Y02T 10/18* (2013.01); *Y02T 10/128* (2013.01); *F02D 41/3035* (2013.01)
USPC .......................... 701/105; 123/90.11; 123/295

(58) Field of Classification Search
USPC .................................. 701/105, 103, 102, 115; 123/90.11–90.18, 294, 295
See application file for complete search history.

(56) References Cited

U.S. PATENT DOCUMENTS

| | | | |
|---|---|---|---|
| 7,213,566 B1 | 5/2007 | Jankovic | |
| 7,478,614 B2 * | 1/2009 | Nakamura et al. | 123/90.15 |
| 8,096,279 B2 * | 1/2012 | Kuzuyama | 123/90.15 |
| 8,195,375 B2 * | 6/2012 | Chen et al. | 701/103 |

* cited by examiner

*Primary Examiner* — Hieu T Vo

(57) ABSTRACT

A control system for a homogeneous charge compression ignition (HCCI) engine includes first and second modules. The first module determines an adjusted intake valve opening (IVO) timing based on a base IVO timing and an IVO timing adjustment, wherein the IVO timing adjustment is based on one or more of a plurality of operating parameters. The second module controls intake valves of the HCCI engine based on the adjusted IVO timing.

18 Claims, 3 Drawing Sheets

SYSTEM AND METHOD FOR CONTROLLING INTAKE VALVE TIMING IN HOMOGENEOUS CHARGE COMPRESSION IGNITION ENGINES

FIELD

The present disclosure relates to internal combustion engines and more particularly to a system and method for controlling intake valve timing in homogeneous charge compression ignition (HCCI) engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The air in the intake manifold is distributed to a plurality of cylinders and combined with fuel from a plurality of fuel injectors creating an air/fuel (A/F) mixture. The A/F mixture is combusted within the cylinders to drive pistons that rotatably turn a crankshaft and generate drive torque.

Homogeneous charge compression ignition (HCCI) engines may operate in a plurality of modes. In a first combustion mode, HCCI engines compress the A/F mixture using the pistons until the A/F mixture auto-ignites. Alternatively, in a second combustion mode (also known as mixed-mode), HCCI engines may compress the A/F mixture using the pistons and may provide spark combust the compressed A/F mixture.

SUMMARY

A control system for a homogeneous charge compression ignition (HCCI) engine includes first and second modules. The first module determines an adjusted intake valve opening (IVO) timing based on a base IVO timing and an IVO timing adjustment, wherein the IVO timing adjustment is based on one or more of a plurality of operating parameters. The second module controls intake valves of the HCCI engine based on the adjusted IVO timing.

A method for controlling a homogeneous charge compression ignition (HCCI) engine includes determining an adjusted intake valve opening (IVO) timing based on a base IVO timing and an IVO timing adjustment, wherein the IVO timing adjustment is based on one or more of a plurality of operating parameters, and controlling intake valves of the HCCI engine based on the adjusted IVO timing.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
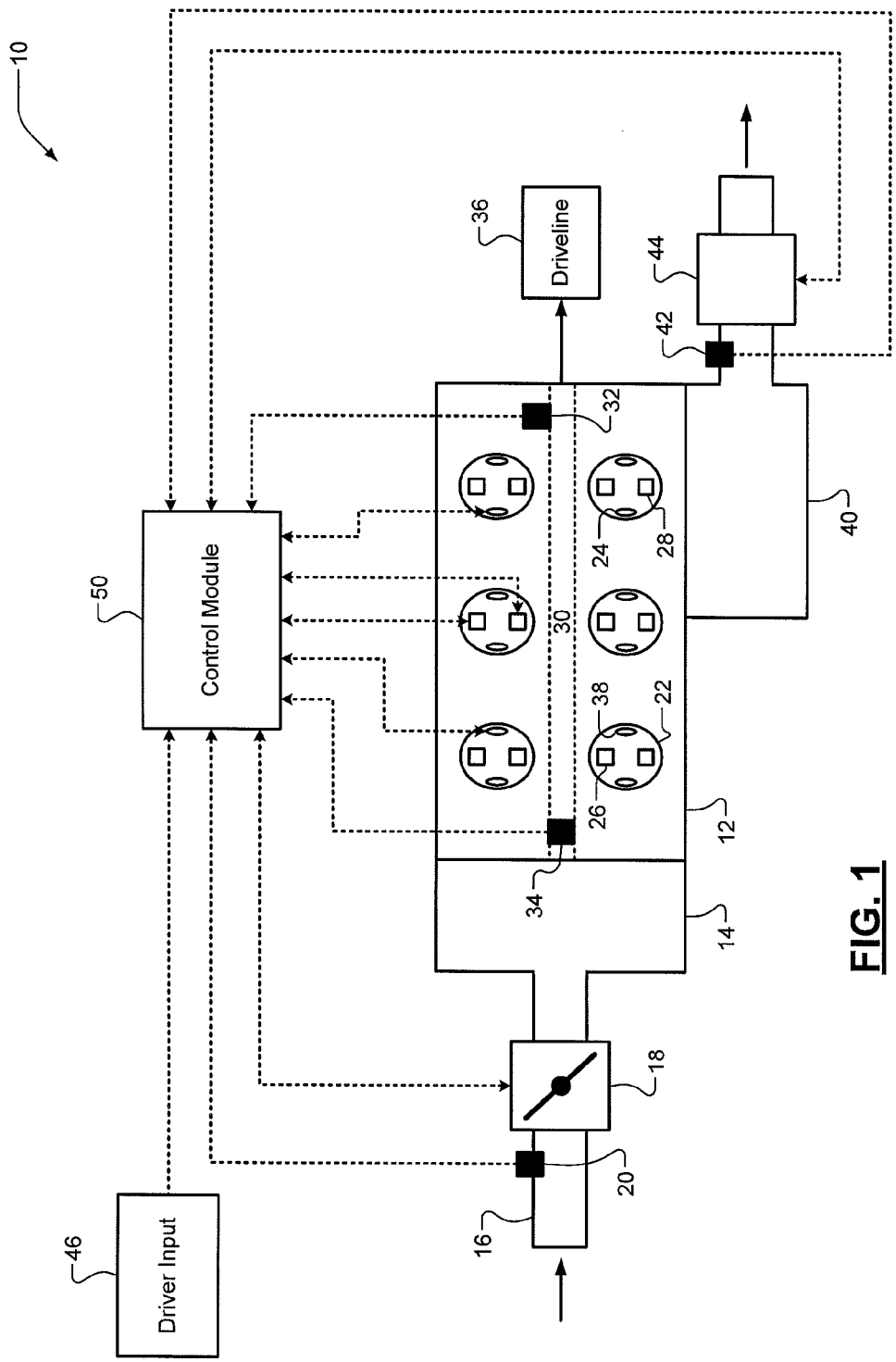
FIG. 1 is a functional block diagram of an example engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A homogeneous charge compression ignition (HCCI) engine achieves the necessary critical pressure and temperature for combustion by controlling negative valve overlap (NVO). NVO represents camshaft or crankshaft degrees between exhaust valve closing (EVC) and intake valve opening (IVO). NVO is determined based on requested airflow and could be symmetric about top dead center (TDC) of gas exchange. The EVC essentially determines the amount of trapped "internal" residual which remains in the cylinder (i.e. the exhaust valve closes before TDC, preventing the remaining burned gas from being expelled). This trapped residual that remains in the cylinder is re-compressed till the piston reaches TDC and is expanded by the downward motion of the piston until IVO.

For optimization of pumping losses, the trapped residual is essentially a spring during this process. If the IVO is too early, not all of the energy stored in the "spring" is extracted during the expansion. Burned gas is thereby forced back into the intake manifold and pumping losses increase. If the IVO is too late, however, the pumping losses increase due to the pressure in the cylinder being far below the intake manifold pressure at IVO. Factors that change the effective energy of the spring during this compression and expansion process alter the IVO at which the minimum pumping loss is obtained. In general, the optimum IVO is earlier if energy is removed and the optimum IVO is later if energy is added. For example, factors which add energy include, but are not limited to, spark events with fuel present in the charge (mixed mode). Additionally, for example, factors which remove energy include, but are not limited to, charge loss due to leakage past the piston rings, heat transfer to cylinder liners, and/or charge cooling due to early fuel injection.

Adding spark events and injection events in the re-compression phase can cause positive pumping mean effective pressure (PMEP). Positive PMEP may cause a commanded IVO timing to differ from a symmetric IVO timing with respect to EVC timing. Rather, a predetermined IVO timing commanded by a control system may be earlier than or later than the symmetric IVO timing. As previously described, an earlier than desired IVO timing may allow air to escape from a cylinder whereas a later than desired IVO timing may prevent a desired amount of air from entering the cylinder. Early or late IVO timing may increase pumping losses thereby decreasing fuel economy and/or performance.

Accordingly, a system and method for improved control of intake valve timing in an HCCI engine is presented. The system and method may determine an IVO timing adjustment based on a PMEP of cylinders of the engine. Specifically, the system and method may determine the IVO timing adjustment based on one or more of a plurality of operating parameters that affect combustion energy. For example, the plurality of operating parameters may include a number of sparks per cycle, air charge loss, air charge cooling. The number of sparks per cycle may increase combustion energy whereas the air charge loss and air charge cooling may decrease combustion energy.

The air charge loss may be due to leakage past the piston rings entering the crankcase from the cylinder. The air charge cooling may be due to decrease in temperature due to fueling events. Specifically, the air charge cooling may be based on fuel injection timing, number of fuel injections per cycle, air/fuel (A/F) ratio, vaporization efficiency, and/or heat transfer (e.g., to the cylinder walls). Furthermore, the vaporization efficiency and heat transfer may vary as a function of other operating parameters such as engine speed, engine load, and/or engine wear.

The system and method may then control intake valves of the HCCI engine based on an adjusted IVO timing. The adjusted IVO timing may be based on a base IVO timing and the IVO timing adjustment. For example, the base IVO timing may be symmetric to an EVC timing about the gas exchange TDC. The desired NVO (in camshaft or crankshaft degrees) is the sum of the EVC before TDC and the IVO after TDC. The desired NVO may be based on driver input such as a desired/requested mass air flow (MAF). Additionally, in some implementations, MAF into the HCCI engine and/or oxygen-level in exhaust gas produced by the HCCI engine may be used as feedback to further improve intake valve timing control (i.e., faster and/or more accurate adjustments to IVO timing).

Referring now to FIG. 1, an engine system 10 includes an engine 12. The engine 12 may be an HCCI engine. The engine 12 draws air into an intake manifold 14 through an induction system 16 that may be regulated by a throttle 18. For example, the throttle 18 may be electrically controlled using electronic throttle control (ETC). A MAF sensor 20 may measure a MAF rate into the intake manifold 14. For example, the measured MAF rate may indicate an engine load. The air in the intake manifold 14 is distributed to a plurality of cylinders 22 through a plurality of intake valves 24, respectively.

The air is combined with fuel from a plurality of fuel injectors 26, respectively, to create an A/F mixture. For example, the fuel injectors 26 may be configured for single point injection (SPI). The A/F mixture is compressed by pistons (not shown) within the cylinders 22. The A/F mixture may be combusted either by compression or by compression and spark from spark plugs 28. In HCCI mode, the A/F mixture may auto-ignite when the temperature and/or pressure of the compressed A/F mixture exceeds a critical threshold. In mixed-mode, on the other hand, the temperature and/or pressure of A/F mixture may be increased in the re-compression phase after EVC and then ignited by spark from the spark plugs 28.

The combustion of the A/F mixture drives the pistons (not shown) which rotatably turn a crankshaft 30 and generate drive torque. An engine speed sensor 32 measures a rotational speed of the crankshaft 30 (e.g., in revolutions per minute, or RPM). The crankshaft 30 may be housed in a crankcase (not shown). A flow model may be used to estimate or a blowby or crankcase pressure sensor 34 may be used to indirectly measure a volume of blowby gases that are entering the crankcase (not shown) past piston rings in the cylinders 22. For example, the measured blowby may be used to determine the air charge loss within a cylinder 22. The drive torque may be transferred to a driveline 36 of a vehicle via a transmission (not shown). For example, a sensor may measure a rotational speed of the driveline 36, the measured rotational speed indicating vehicle speed.

Exhaust gas produced during combustion may be expelled from the cylinders 22 through a plurality of exhaust valves 38, respectively, and into an exhaust manifold 40. An oxygen sensor 42 measures an amount of oxygen in the exhaust gas. The exhaust gas may be treated by an exhaust treatment system 44 before being released into the atmosphere. For example, the exhaust treatment system 44 may include, but is not limited to, at least one of an oxidation catalyst (OC), a nitrogen oxide (NOx) adsorber/absorber, a selective catalytic reduction (SCR) catalyst, a particulate matter (PM) filter, and a three-way catalytic converter. Driver input 46 represents input from a driver of the vehicle. For example, the driver input 46 may be a position of an accelerator (e.g., a pedal).

A control module 50 controls operation of the engine system 10. The control module 50 may receive signals from throttle 18, the MAF sensor 20, the intake valves 24, the fuel injectors 26, the spark plugs 28, the engine speed sensor 32, the flow model, the blowby or crankcase pressure sensor 34, the driveline 36, the exhaust valves 38, the oxygen sensor 42, the exhaust treatment system 44, and/or driver input 46. The control module 50 may control the throttle 18, the intake valves 24, the fuel injectors 26, the spark plugs 28, the exhaust valves 38, and/or the exhaust treatment system 44. The control module 50 may also implement the system or method of the present disclosure.

Figure 2:
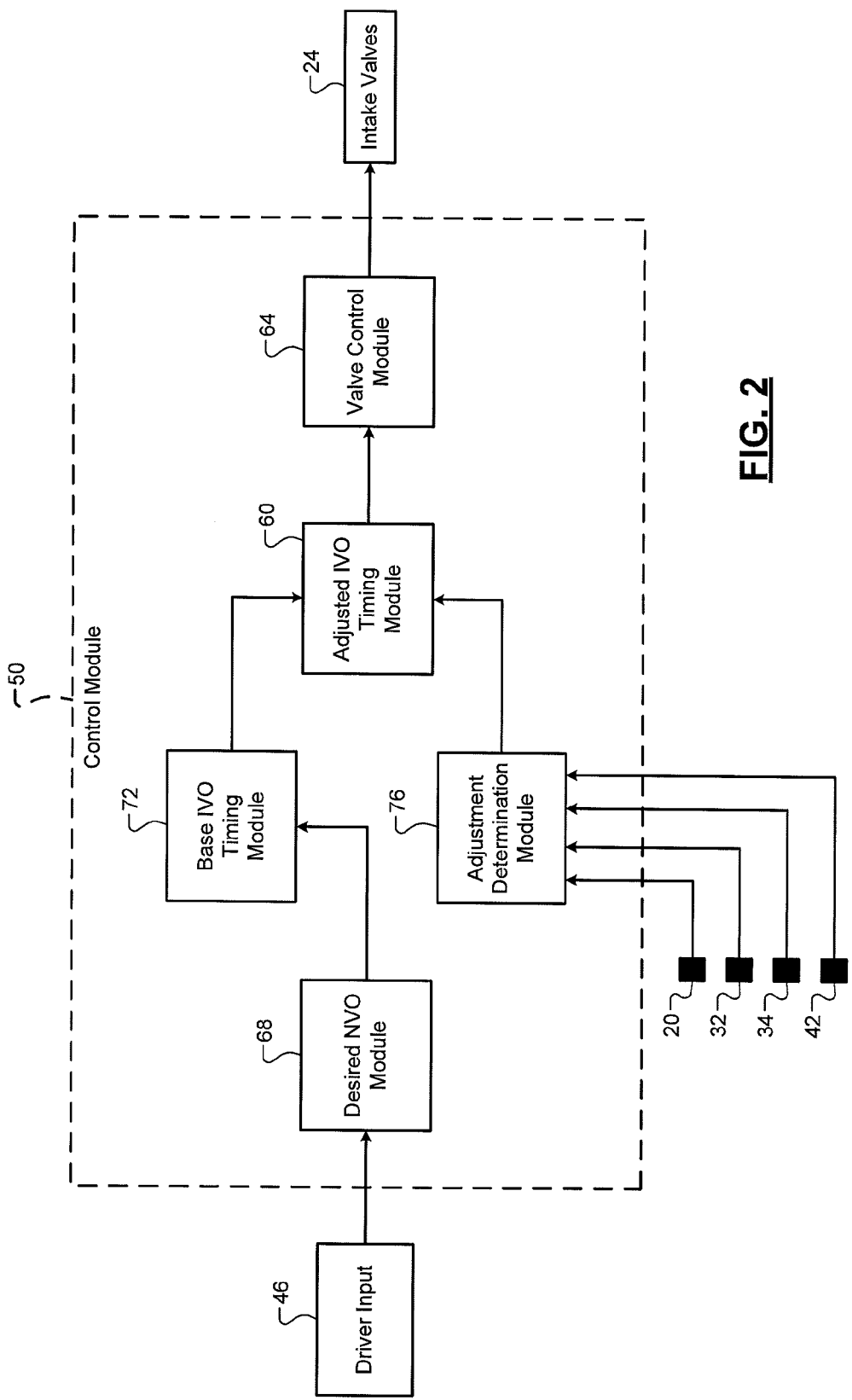
FIG. 2 is a functional block diagram of an example control module according to one implementation of the present disclosure.

Referring now to FIG. 2, an example of the control module 50 is shown. The control module 50 may include an adjusted IVO timing module 60 and a valve control module 64. The control module 50 may also include a desired NVO module 68, a base IVO timing module 72, and an adjustment determination module 76. The adjusted IVO timing module 60 may also be referred to as a first module. The valve control module 64 may also be referred to as a second module. The desired NVO module 68 may also be referred to as a third module. The base IVO timing module 72 may also be referred to as a fourth module. The adjustment determination module 76 may also be referred to as a fifth module.

The adjusted IVO timing module 60 determines an adjusted IVO timing. The adjusted IVO timing module 60 may determine the adjusted IVO timing based on a base IVO timing and an IVO timing adjustment. For example, the base IVO timing may be symmetric to a base EVC timing about a midpoint of a desired NVO (i.e., point of TDC gas exchange). The valve control module 64 may control the intake valves 24 based on the adjusted IVO timing. The adjusted IVO timing may increase fuel economy and/or performance.

The desired NVO module 68 determines the desired NVO based on driver input 46. The driver input 46 may include a desired MAF. For example, the driver input 46 may be based on a position of an accelerator (e.g., a pedal). The base IVO timing module 72 determines the base IVO timing based on the desired NVO. As previously described, the base IVO timing module 72 may determine the base IVO timing so as to be symmetric to the base EVC timing about the midpoint of the desired NVO or point of TDC gas exchange.

The adjustment determination module 76 determines the IVO timing adjustment. The IVO timing adjustment may be based on a PMEP of cylinders 22 of the HCCI engine 12. The PMEP of the cylinders 22, however, may be unknown. Rather, implementing pressure sensors in each of the cylinders 22 may increase costs. Therefore, the adjustment determination module 76 may determine the IVO timing adjustment based on one or more of a plurality of operating parameters that affect combustion energy. For example, the plurality of operating parameters may include a number of sparks per cycle, air charge loss, and air charge cooling. The number of sparks per cycle may increase combustion energy whereas the air charge loss and air charge cooling may decrease combustion energy.

The air charge may cool due to fueling. Specifically, the air charge temperature may decrease based on fuel injection timing, number of fuel injections per cycle, fuel type, A/F ratio, vaporization efficiency, and/or heat transfer. Vaporization efficiency may represent a percentage of the A/F mixture that is combusted during an engine cycle. Heat transfer may represent a decrease in air charge temperature due to the transfer of heat to the cylinder walls. The vaporization efficiency, heat transfer, and a charge loss correction are may be functions of other operating parameters such as engine speed, engine load, and/or engine wear.

In some implementations, the fuel injection timing and A/F ratio may be predetermined. The number of fuel injections and/or number of sparks per cycle, on the other hand, may vary depending on the operating mode of the HCCI engine 12. The air charge loss, the engine speed, and the engine load may be estimated by the flow model or measured indirectly by the blowby or crankcase pressure sensor 34, the engine speed sensor 32, and the MAF sensor 20, respectively. In addition, the heat transfer may be based on various temperatures such as intake air temperature (IAT), engine coolant temperature (ECT), and/or exhaust gas temperature (EGT).

Specifically, the IVO timing adjustment may advance the adjusted IVO timing when the following parameters increase: (i) air charge loss due to blowby and/or (ii) air charge cooling due to fuel injection, which is further based on fuel injection timing, number of fuel injections per cycle, fuel type, A/F ratio, vaporization efficiency, and/or heat transfer. The vaporization efficiency and heat transfer may be functions of engine speed, engine load, engine wear, etc. In addition, the IVO timing adjustment may retard the adjusted IVO timing when the following parameter increases: number of spark events per cycle during mixed mode combustion. In other words, depending on the implementation, the IVO timing adjustment may be (i) a positive quantity and therefore added to or subtracted from the base IVO timing according to the parameters, or (ii) a positive or negative quantity added to the base IVO timing.

Figure 3:
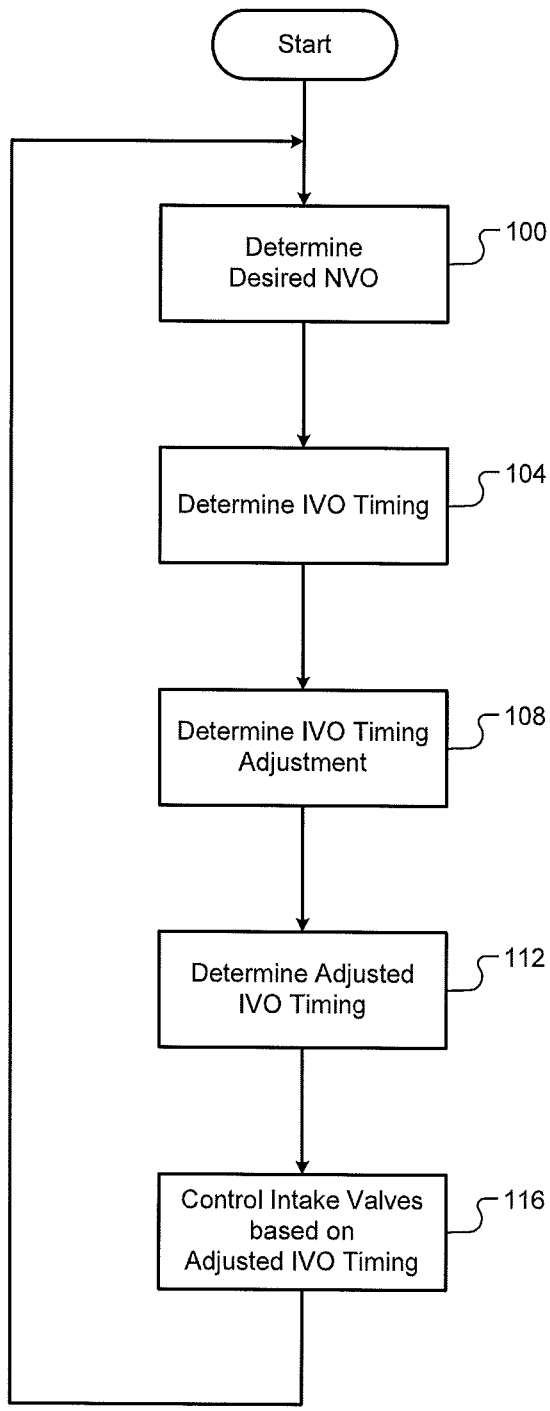
FIG. 3 is a flow diagram illustrating an example method of controlling intake valve timing in a homogeneous charge compression ignition (HCCI) engine according to one implementation of the present disclosure.

Referring now to FIG. 3, an example method for controlling intake valve timing in an HCCI engine begins at 100. At 100, the control module 50 determines a desired NVO based on driver input 46 (e.g., desired MAF). At 104, the control module 50 determines a base IVO timing to be symmetric to a base EVC timing about a midpoint of the desired NVO. At 108, the control module 50 determines the IVO timing adjustment based on one or more of the plurality of operating parameters. At 112, the control module 50 determines the adjusted IVO timing based on the base IVO timing and an IVO timing adjustment. At 116, the control module 50 controls intake valves of the engine based on the adjusted IVO timing. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a homogeneous charge compression ignition (HCCI) engine, the control system comprising:
a first module that determines an adjusted intake valve opening (IVO) timing based on a base IVO timing and an IVO timing adjustment, wherein the IVO timing adjustment is calculated based on a number of sparks per cycle, air charge loss, and air charge cooling; and
a second module that controls intake valves of the HCCI engine based on the adjusted IVO timing.

2. The control system of claim 1, wherein the IVO timing adjustment is retarded or advanced with respect to the base IVO timing to minimize the pumping mean effective pressure (PMEP) losses of the resulting cycle.

3. The control system of claim 1, further comprising a third module that determines a desired negative valve overlap (NVO) based on a desired mass air flow (MAF) into the HCCI engine.

4. The control system of claim 3, further comprising a fourth module that determines the base IVO timing based on the desired NVO.

5. The control system of claim 4, wherein the fourth module determines the base IVO timing such that the base IVO timing is symmetric to a base exhaust valve closing (EVC) timing about midpoint of the desired NVO.

6. The control system of claim 4, further comprising a fifth module that determines the IVO timing adjustment based on the number of sparks per cycle, the air charge loss, and the air charge cooling and feedback from at least one of a mass air flow (MAF) sensor and an oxygen sensor located in an exhaust system of the HCCI engine.

7. The control system of claim 4, wherein the IVO timing adjustment retards the adjusted IVO timing with respect to the base IVO timing when the number of sparks per cycle increases.

8. The control system of claim 4, wherein the IVO timing adjustment advances the adjusted IVO timing with respect to the base IVO timing when air charge loss increases or air charge temperature decreases.

9. The control system of claim 8, wherein the air charge cooling is further based on at least one of fuel injection timing, number of fuel injections per cycle, fuel type, air/fuel (A/F) ratio, vaporization efficiency, and heat transfer to cylinder walls, and wherein a magnitude of the vaporization efficiency and the heat transfer to cylinder walls are functions of at least one of engine speed, engine load, and engine wear.

10. A method for controlling a homogeneous charge compression ignition (HCCI) engine, the method comprising:
   determining an adjusted intake valve opening (IVO) timing based on a base IVO timing and an IVO timing adjustment, wherein the IVO timing adjustment is calculated based on a number of sparks per cycle, air charge loss, and air charge cooling; and
   controlling intake valves of the HCCI engine based on the adjusted IVO timing.

11. The method of claim 10, wherein the IVO timing adjustment is retarded or advanced with respect to the base IVO timing to minimize the pumping mean effective pressure (PMEP) losses of the resulting cycle.

12. The method of claim 10, further comprising determining a desired negative valve overlap (NVO) based on a desired mass air flow (MAF) into the HCCI engine.

13. The method of claim 12, further comprising determining the base IVO timing based on the desired NVO.

14. The method of claim 13, further comprising determining the base IVO timing such that the base IVO timing is symmetric to a base exhaust valve closing (EVC) timing about midpoint of the desired NVO.

15. The method of claim 13, further comprising determining the IVO timing adjustment based on the number of sparks per cycle, the air charge loss, and the air charge cooling and feedback from at least one of a mass air flow (MAF) sensor and an oxygen sensor located in an exhaust system of the HCCI engine.

16. The method of claim 13, wherein the IVO timing adjustment retards the adjusted IVO timing with respect to the base IVO timing when the number of sparks per cycle increases.

17. The method of claim 13, wherein the IVO timing adjustment advances the adjusted IVO timing with respect to the base IVO timing when air charge loss increases or air charge temperature decreases.

18. The method of claim 17, wherein the air charge cooling is further based on at least one of fuel injection timing, number of fuel injections per cycle, fuel type, air/fuel (A/F) ratio, vaporization efficiency, and heat transfer to cylinder walls, and wherein a magnitude of the vaporization efficiency and the heat transfer to cylinder walls are functions of at least one of engine speed, engine load, and engine wear.

* * * * *